W. M. SANDERS.
COTTON CHOPPER AND SCRAPER.

No. 181,211.                 Patented Aug. 15, 1876.

WITNESSES  
Henry N. Miller  
Franck L. Ourand

INVENTOR  
Wm. M. Sanders  
By Alexander Mason  
Attorneys.

UNITED STATES PATENT OFFICE.

WILLIAM M. SANDERS, OF PONTOTOC COUNTY, MISSISSIPPI.

IMPROVEMENT IN COTTON CHOPPER AND SCRAPER.

Specification forming part of Letters Patent No. 181,211, dated August 15, 1876; application filed April 7, 1876.

*To all whom it may concern:*

Be it known that I, WILLIAM MOORE SANDERS, of the county of Pontotoc, and in the State of Mississippi, have invented certain new and useful Improvements in a Combined Cotton Chopper and Scraper; and do hereby declare that the following is a full, clear, and exact description thereof, reference being had to the accompanying drawings, and to the letters of reference marked thereon, making a part of this specification.

This invention relates to improvements in cotton choppers and scrapers; and consists in the combination of parts, hereinafter more particularly described.

Figure 1:
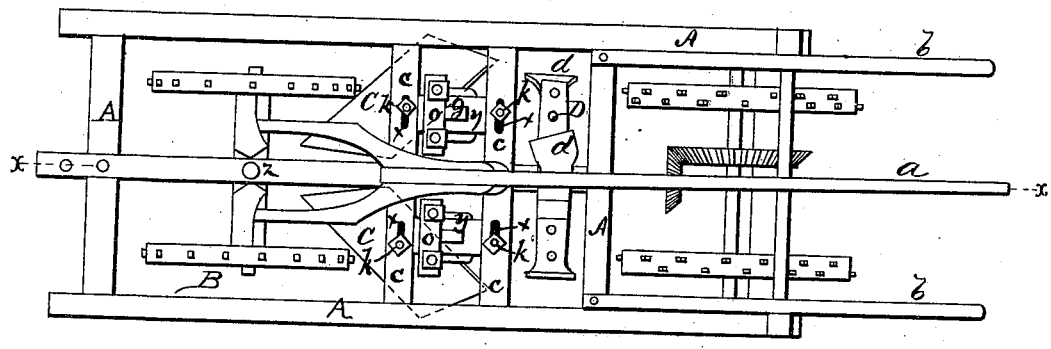
Figure 2:
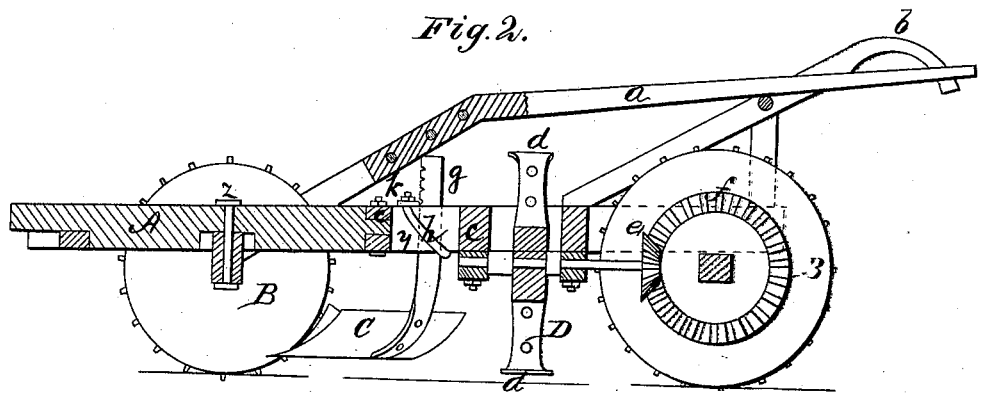

In the drawings, Figure 1 is a plan, and Fig. 2 is a section, of my improved machine, showing the construction and relative arrangement of parts.

A is a frame, supported upon wheels, as shown. The front wheels are connected with the frame by means of a pivot or king-bolt, Z, and have a handle, a, projecting backward over the frame and between the main handles b b, so that the machine may be guided by the operator as may be desired.

C C are plows or scrapers, arranged, as shown, to work on opposite sides of the row, to clean and prepare the way for the chopper. At or near the center of the frame are two cross-bars, c c, between which are placed short blocks y y—one on either side of the longitudinal center of the frame. The plows C are connected to metallic shanks g, notched near the top at the front edge, as shown in Fig. 2. The shanks g pass through slots in the blocks y, and are adjustably secured by a bail, h, which bail is connected to a metallic plate, o, resting on top of the block. The notches in the forward edge of the shank engage on the plate, and the shank is thus rigidly held at the required height. The cross-bars c c are slotted, as shown at x, and are cut away on the under edges, so that when the blocks y are fitted under and between the cross-bars c, and held by the bolts and nuts k, the said bars, carrying the plows, are laterally adjustable toward or from each other, as desired.

D represents a rotary wheel or driver, upon which is secured a series of knives or cutters, d. This wheel D is mounted on a shaft running lengthwise of the machine. The shaft has a bevel-pinion, e, on its rear end, which meshes with a driving-pinion, f, on one of the hind wheels.

The wheels are provided with suitable spurs to take hold of the ground, and thus cause the rotation of the chopper under all circumstances. The knives on the chopper are preferably arranged so that the cutting-edge shall be at an angle, so as to give a kind of draw cut. The number of knives depends upon the gearing between the driving-wheel and longitudinal shaft.

A chopper made as above described is entirely within the control of the operator, and can be run with great precision, the handle a giving complete control of the machine.

The operation of the machine is obvious, and therefore needs no further description.

Having thus fully described my invention, what I claim as new, and desire to secure by Letters Patent, is—

The combination, with the frame A, having cross-bars c c with slots x x, of the plows C C, connected to notched shanks g g, the slotted blocks y y, clasping-bails h h, and metallic plates o o, whereby the plows are laterally and vertically adjustable in front of the chopping-wheel, all substantially as herein set forth.

In testimony that I claim the foregoing I have hereunto set my hand and seal this 23d day of February, 1876.

WM. MOORE SANDERS. [L. S.]

Witnesses:
  C. L. EVERT,
  A. J. CLARK.